March 2, 1954  G. T. R. HILL ET AL  2,670,910
AIRCRAFT
Filed Aug. 16, 1950  6 Sheets-Sheet 1
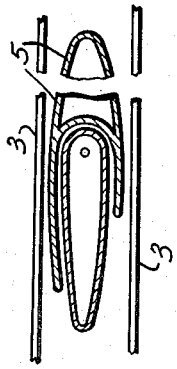
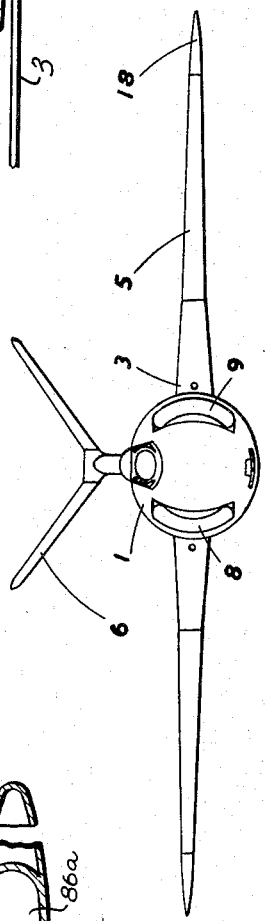
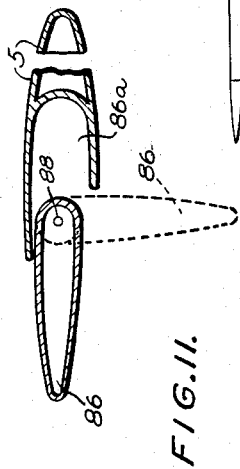
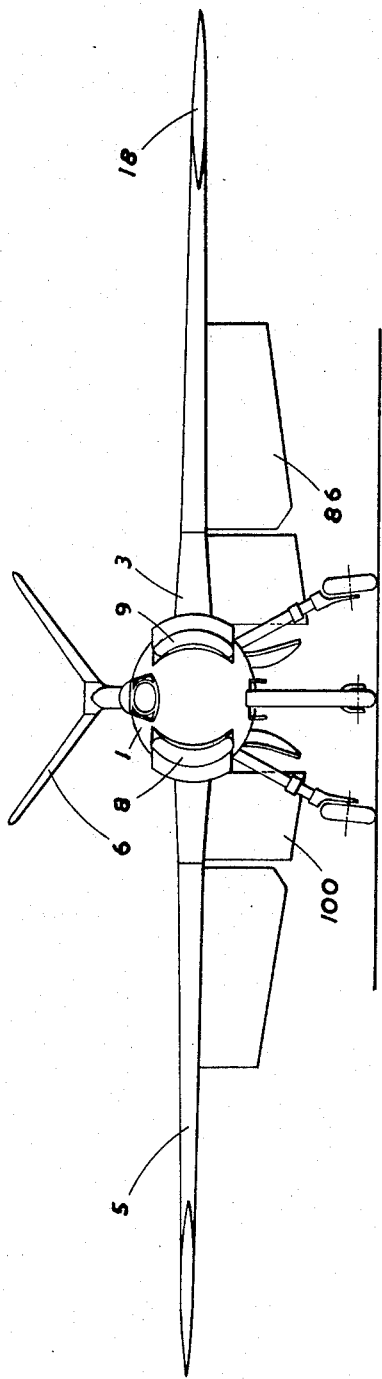
Inventors:
GEOFFREY TERENCE ROLAND HILL
THOMAS GEORGE GUPPY
By Richardson, David and Nordon
Attorneys March 2, 1954

G. T. R. HILL ET AL 2,670,910

AIRCRAFT

Filed Aug. 16, 1950

Inventors:
GEOFFREY TERENCE ROLAND HILL
THOMAS GEORGE GUPPY

By Richardson, David and Nordon.
Attorneys

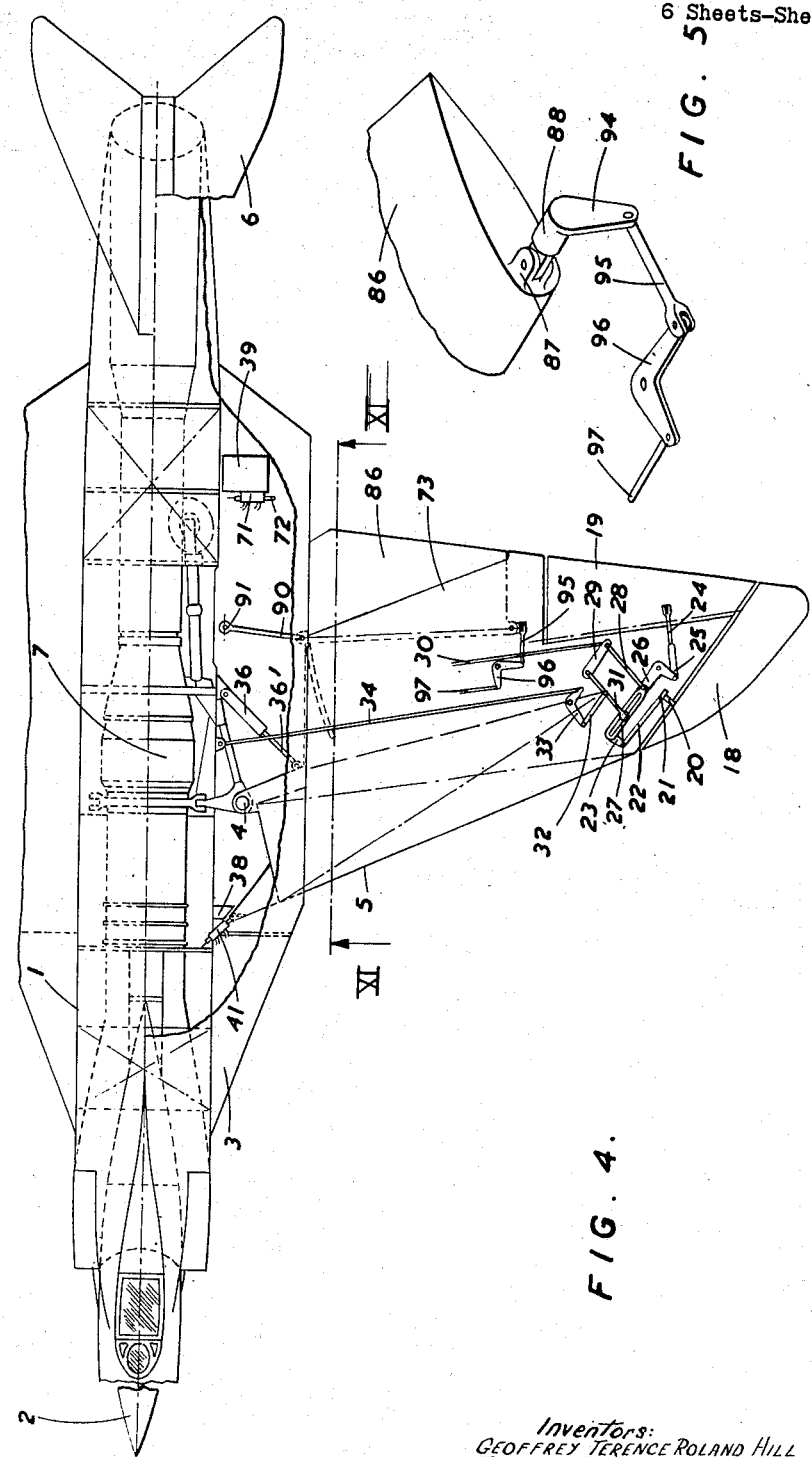

March 2, 1954 G. T. R. HILL ET AL 2,670,910
AIRCRAFT
Filed Aug. 16, 1950 6 Sheets-Sheet 4
FIG. 6
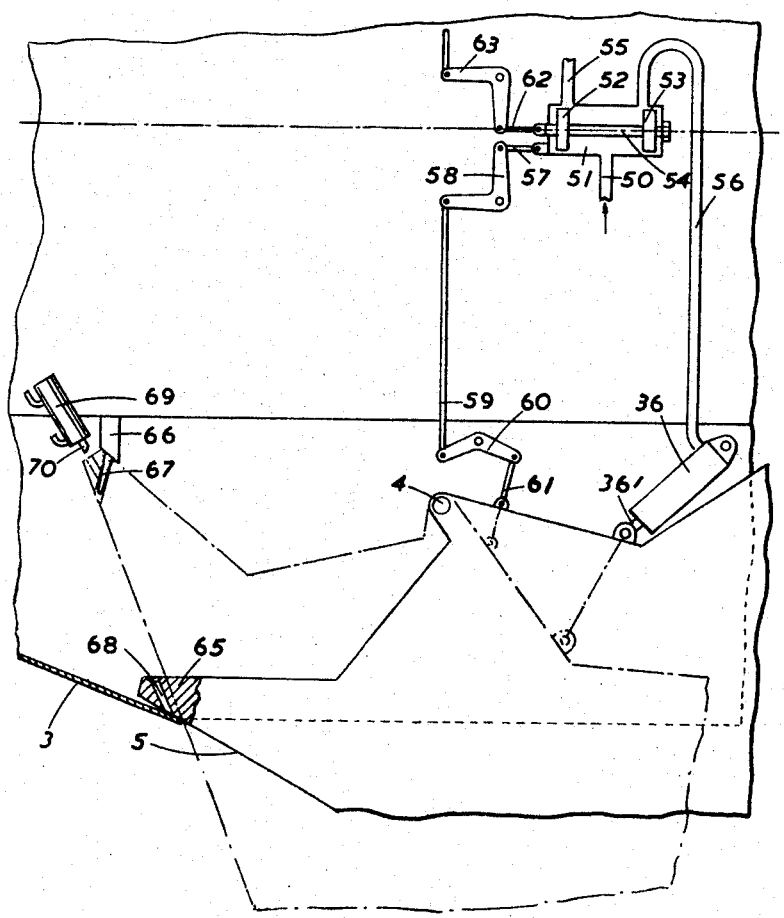
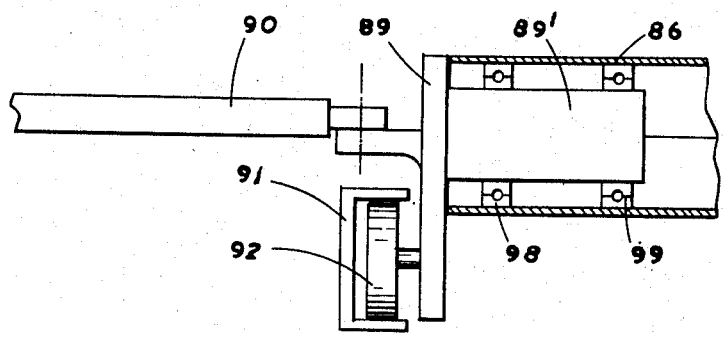
FIG. 7
Inventors:
GEOFFREY TERENCE ROLAND HILL
THOMAS GEORGE GUPPY
By Richardson, David and Nordon
Attorneys March 2, 1954  G. T. R. HILL ET AL  2,670,910
AIRCRAFT
Filed Aug. 16, 1950  6 Sheets-Sheet 5
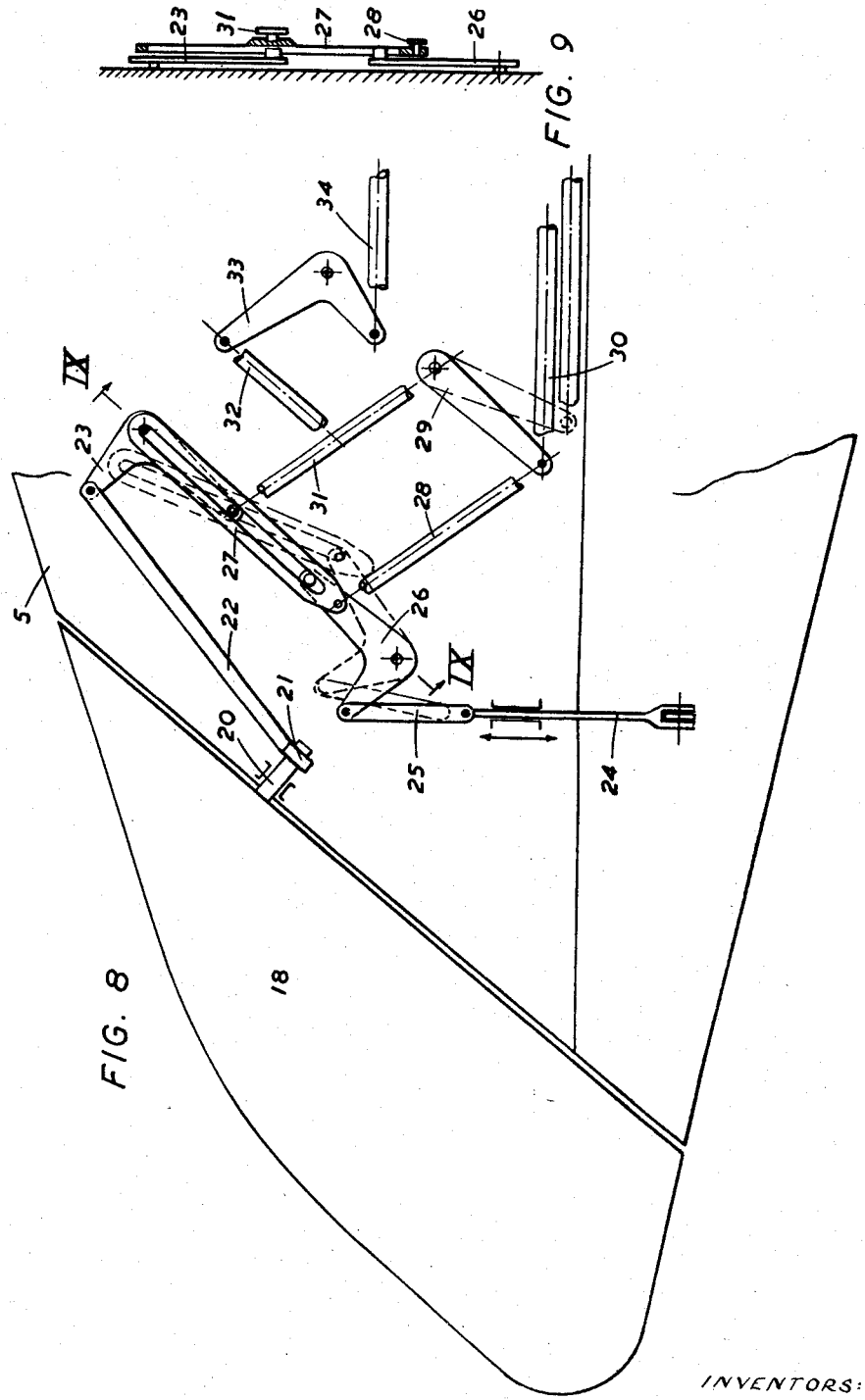
INVENTORS:
GEOFFREY TERENCE ROLAND HILL
THOMAS GEORGE GUPPY
By Richardson, David and Nordon
Attorneys March 2, 1954

G. T. R. HILL ET AL 2,670,910

AIRCRAFT

Filed Aug. 16, 1950

Inventors:
GEOFFREY TERENCE ROLAND HILL
THOMAS GEORGE GUPPY
By Richardson, David and Nordon
Attorneys Patented Mar. 2, 1954

2,670,910

UNITED STATES PATENT OFFICE 2,670,910

AIRCRAFT

Geoffrey Terence Roland Hill, Londonderry, Northern Ireland, and Thomas George Guppy, Hanwell, London, England, assignors to Blackburn and General Aircraft Limited, Brough, England, a British company Application August 16, 1950, Serial No. 179,704

Claims priority, application Great Britain September 16, 1949

4 Claims. (Cl. 244—43)

This invention relates to aircraft capable of flying at very high speeds up to transonic and supersonic speeds and is concerned with what kind of aircraft in which the wings are capable of being swung from a high speed position, in which they have a highly swept-back plan form giving a low drag, to a low speed position in which they extend normal to the aircraft or are only slightly swept-back and provide an increased lifting surface of increased span and aspect ratio. Such an aircraft is, for example, described in the specification of the pending United States application Serial No. 167,718, filed June 12, 1950, and now abandoned, and in such an aircraft a high degree of sweep-back is required for high speed flight regardless of aspect ratio with a low thickness/chord ratio to give low drag whilst the low speed requirement is for increased effective wing area and increased span and aspect ratio with low sweep-back and greater thickness/chord ratio which are favourable to low landing speeds combined with good handling characteristics on the approach glide and at the moment of landing.

It will be found that if the wings of an aircraft are pivoted about approximately vertical axes so that they can swing backwards and forwards, through the large angular range which is required, i. e. a range of some 40°, then with pivots in the thick part of the wing section, say between $c/4$ and $c/2$ from the leading edge mounted directly on the sides of the body, the trailing edges of the wings must be cut off progressively towards the hinge to allow the wings to lie along the side of the body in the swept-back configuration. It will now be found that if the wings, whose shape is limited in this way, are swept forward into the low speed configuration, the wing chord will be progressively reduced towards the wing root, starting from a point in the region of half the semi-span, with an accompanying loss of lift.

Due to the movement of the wings from swept-back to spread position and vice versa, a change occurs in the position of the centre of gravity as well as of the centre of pressure, and the effect of the change in the position of the centre of pressure can largely be compensated by creating a greater degree of displacement of the centre of gravity, for example, in the manner described in the said pending United States patent application Serial No. 167,718 as by providing tanks in the leading edges of the wing to contain fuel which is used last of all.

An object of the present invention is to provide means effective on movement of the wings from the high speed configuration to the low speed configuration which will increase the wing chord at the wing root to avoid the disadvantage in the shape which it is necessary to give to the wing to permit it to swing back to the swept-back position as mentioned above.

Another object of the invention is to reduce the displacement of the centre of pressure to a minimum to maintain a substantially constant longitudinal trim.

With these objects in view, a high speed aircraft having its wing roots lying within shrouds or skirts extending symmetrically along each side of the fuselage within which they are pivoted outboard of the fuselage with such shrouds or skirts forming part of the wing surfaces in all positions of the wings, according to the present invention has each of its wings provided with an auxiliary wing surface which is housed in a recess in that portion of the trailing edge of wing which is contained in the skirt or shroud when the wing is swept back at an acute angle to the longitudinal axis of the fuselage and which is extended to increase the effective wing chord of that portion of the wing when the wing is swung forward to extend substantially normal to the longitudinal axis of the fuselage.

The said auxiliary wing surface is pivoted to the main wing and linked to the fuselage in such a way that movement of the main wing member to the low speed position causes the auxiliary wing surface to emerge from the recess to form a rearward extension of the inner part of the wing with its trailing edge forming an inward prolongation of the trailing edge of the outer part of the wing. Conversely when the main wing is moved rearwardly from low to high speed position, the auxiliary wing member moves into the recess which completely houses it.

According to a further feature of the invention the auxiliary wing is mounted so that it can rotate about its leading edge as a hinge line and so that when in its extended position the said auxiliary wing can serve as a trailing edge flap to the main wing and thereby increase the lift coefficient of the wing as a whole.

The shrouds provide fairing for the structure carrying the main wing pivots, and being hollow inside, they form large recesses into which the trailing edges of the inner parts of the main wings can enter when swept back without fouling the body itself. This allows of some increase of wing chord towards the root, but it is not possible to make such increase as large as is desirable from the point of view of maximum lift without fitting shrouds of a size which become unmanageable from consideration of structural stiffness. The shrouds are therefore designed to extend spanwise as far as it is practicable, and the auxiliary wing surfaces are provided to give the remainder of the increase of chord to the inward parts of the wings.

The invention is particularly applicable to an aircraft design in which a turbo-jet propulsion unit is contained within the fuselage with the efflux duct extending out through the rear thereof.

Now in order that the invention may be clearly understood and readily carried into effect, the same is hereinafter more fully described with reference to the accompanying drawings which are given for purposes of illustration only and not of limitation.

In these drawings:

Figure 1 is a front elevation of the aircraft with the wings swept back in the high speed position, Figure 2 is a similar view with the wings shown spread in the low speed condition showing the wing flaps extended as at landing, with the undercarriage also shown extended, Figure 3 shows the aircraft plan form with the wings swept-back in the high speed position with their longitudinal axes at an acute angle to the longitudinal axis of the fuselage and includes illustration of essential details, Figure 4 is a view similar to Figure 3 with the wings swung forward to their low speed flight position extending substantially normal to the longitudinal axis of the fuselage, Figure 5 is a perspective view of one end of the auxiliary wing showing the pivot at that end thereof and operating means for turning the same to serve as a flap, Figure 6 is a detail view on an enlarged scale showing the spread wing locking means, the jack for effecting movement of the wing between spread and swept-back position and means for ensuring synchronous movements of the jacks, Figure 7 is a detail view, partly in section, of the opposite end of the auxiliary wing to that illustrated in Figure 6 showing the guide track and the link for effecting displacement of that end of the auxiliary wing, Figure 8 is a detail view also on an enlarged scale showing the mechanism for alternatively operating the movable wing tip and trailing edge aileron with the mechanism in the position to lock the wing tip and allow movement of the trailing edge aileron under the pilot's control as when the wing is in its spread position, Figure 9 is a view on the line IX—IX of Figure 8 looking in the direction of the arrows, and Figure 10 is a view similar to Figure 8 with the mechanism in its alternative position to lock the trailing edge aileron and allow movement of the movable wing tip as when the wing is in its swept-back position.

Figure 11 is a fragmentary diagrammatic sectional view taken along the line XI—XI of Figure 4, looking in the direction of the arrows, certain parts being omitted for simplicity of illustration.

Figure 12 is a view similar to Figure 11, but with the wings in swept back position as shown in Figure 3.

Figure 3:
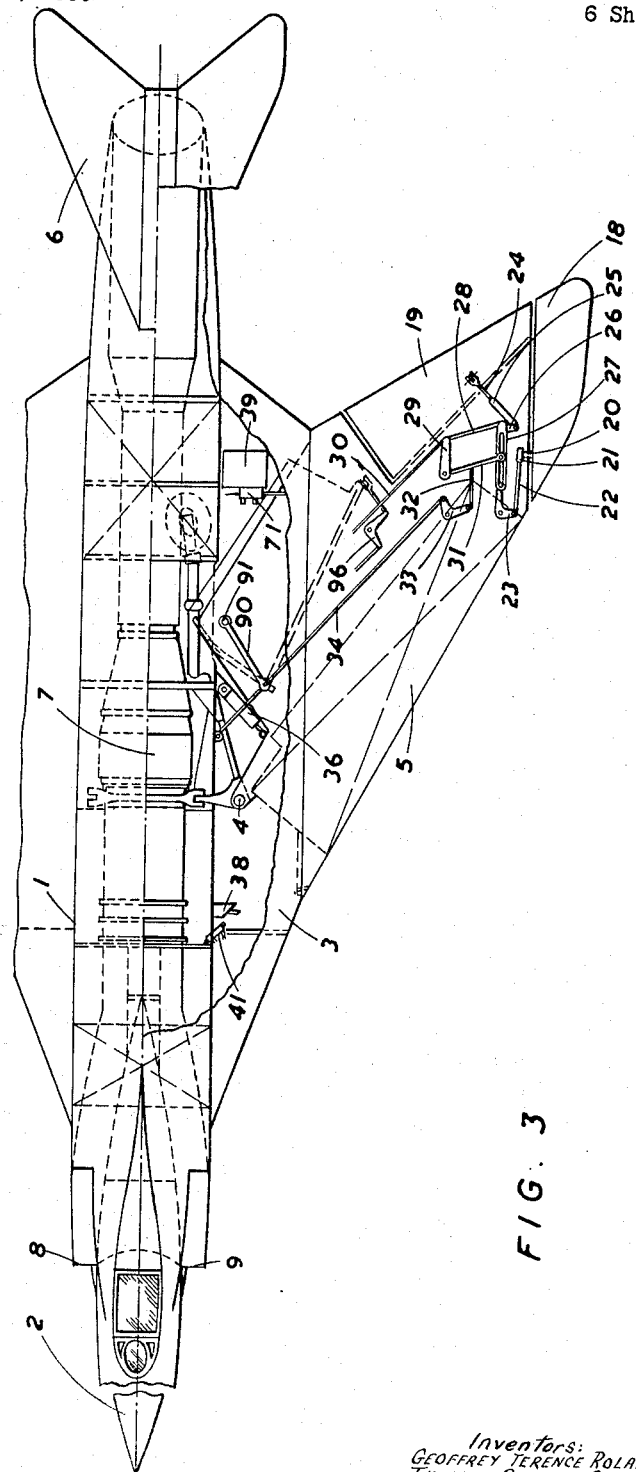

Referring now to the said drawings, in the design illustrated the aircraft fuselage 1 is of elongated form with a sharply pointed nose 2 and carrying at its rear an all-moving surface empenage 6 comprising a short fin supporting all-moving tailplane surfaces having a substantial dihedral angle. A turbo-jet engine 7 is provided within the fuselage in the region of the centre of gravity and the efflux pipe from such engine extends out through the rear extremity of the fuselage. Combustion air is taken in at intakes 8, 9 at the front of the fuselage and carried by ducts to the front of the engine 7 and preferably these intakes are formed with hinged side walls so that the effective cross-sectional areas of opening are variable to suit the air intake requirements of the engine 7 from starting up to high speed flight in the manner described in the specification of the pending United States patent application Ser. No. 167,732, now U. S. Patent No. 2,591,867, issued April 8, 1952.

The fuselage 1 is provided symmetrically along each side with a longitudinally extending hollow skirt or shroud 3 within each of which is pivoted, at a point outboard of the fuselage 1 on a hinge 4, a wing 5 which is mounted to be capable of swinging movement about such hinge 4 from a spread position extending substantially normal to the longitudinal axis of the aircraft as illustrated in Figure 4 in which the span and aspect ratio are at their maximum to a swept-back position as illustrated in Figure 3 in which the wings are at an acute angle to the longitudinal axis of the aircraft with the span and aspect ratio at a minimum and the drag reduced to a minimum.

These shrouds 3 form fairings for the structure carrying the main wing hinges 4 and being hollow they form large recesses into which the trailing edges of the inner parts of the main wings can enter when swept back without fouling the body and into which the leading edges of the inner parts of the wings may extend when the wings are spread so that in all positions of the wings the shrouds form part of the wing surface.

It will be appreciated that the action of sweeping the wing forward from the high speed to the low speed configuration results in increase in the thickness/chord ratio of the aerofoil section in the line of flight, increase in the leading edge radius and the point at which maximum thickness/chord ratio occurs moving forward on the section. Each of these features is of benefit in low speed flight and the increased aspect ratio, which can further be appreciated by comparison between Figures 1 and 2, in this spread position gives increased stability and lateral control which is very necessary at take off and landing.

To enable the wing to take up its swept-back position part of its chord must be progressively cut back from about its midpoint to its root and in the under surface of that portion of the wing there is provided a recess sufficiently large to accommodate an auxiliary wing 86.

The leading edge of this auxiliary wing 86 is conveniently constituted by a tube at the outer end of which is secured a shackle 87 capable of pivoting with respect to a part 88 mounted on the main wing 5 (see Figure 5). The inner end of the tube carries a bracket 89 to which is pivotally connected one end of a link 90, the other end of which is pivoted at 91 to a fixed point within the shroud 3 on the aircraft fuselage 1. The bracket 89 also carries a roller, or pair of rollers, 92 capable of running in an arcuate track 93 (Fig. 7), the virtual centre of which is the pivot of the bracket 87, carried by the wing structure. Thus fore or aft movement of the main wing 5 automatically causes the rollers 92 to travel along the track 93 and rotate the auxiliary wing in a horizontal plane about its corner which is pivoted to the part 88.

When the wing 5 is in the swept-back position as in Figure 3, the auxiliary wing 86 is housed entirely within the recess in the trailing edge of the main wing 5 in the portion thereof which is, in this position, contained in the skirt 3. As the wing 5 is swung forward towards its spread position, the link 90 effects displacement of the inward end of the auxiliary wing 86 with movement of the roller 92 along the track 93 until the main wing 5 reaches its spread position as in Figure 4 when the auxiliary wing 86 is fully extended and increases the wing chord with its trailing edge substantially aligned with, and forming an extension of, the trailing edge of the main wing 5.

The auxiliary wing 86 is also capable of being utilised as a flap by being turned about the longitudinal axis of its leading edge tube, thus the part 88 is rotatable in a bearing in the main wing 5 and has fast thereon a lever 94 which is in turn connected by a link 95, a bell crank lever 96 and an operating rod 97 to means such as a jack (not shown) and operable under the pilot's control axially to displace the control rod 97 to rock the bell crank lever 96 and hence the lever 94 to turn the auxiliary wing 86 of its normal horizontal plane, which movement is permitted by interposing anti-friction bearings 98, 99 between the leading edge tube of the auxiliary wing 86 and the boss 89¹ of the bracket 89 at that end of the auxiliary wing 86, to extend down as a high lift flap (see Figure 2). Suitable interlocking devices are provided to prevent operation of the auxiliary wings 86 as flaps except when they are fully extended in wing spread position.

Additional high lift flaps 100 of conventional type are fitted in the under surface of the shrouds 3; these are lowered when the auxiliary wings 86 on the wing are lowered so that an optimum portion of the wing spring is flapped in the interests of obtaining high lift.

Figure 10:
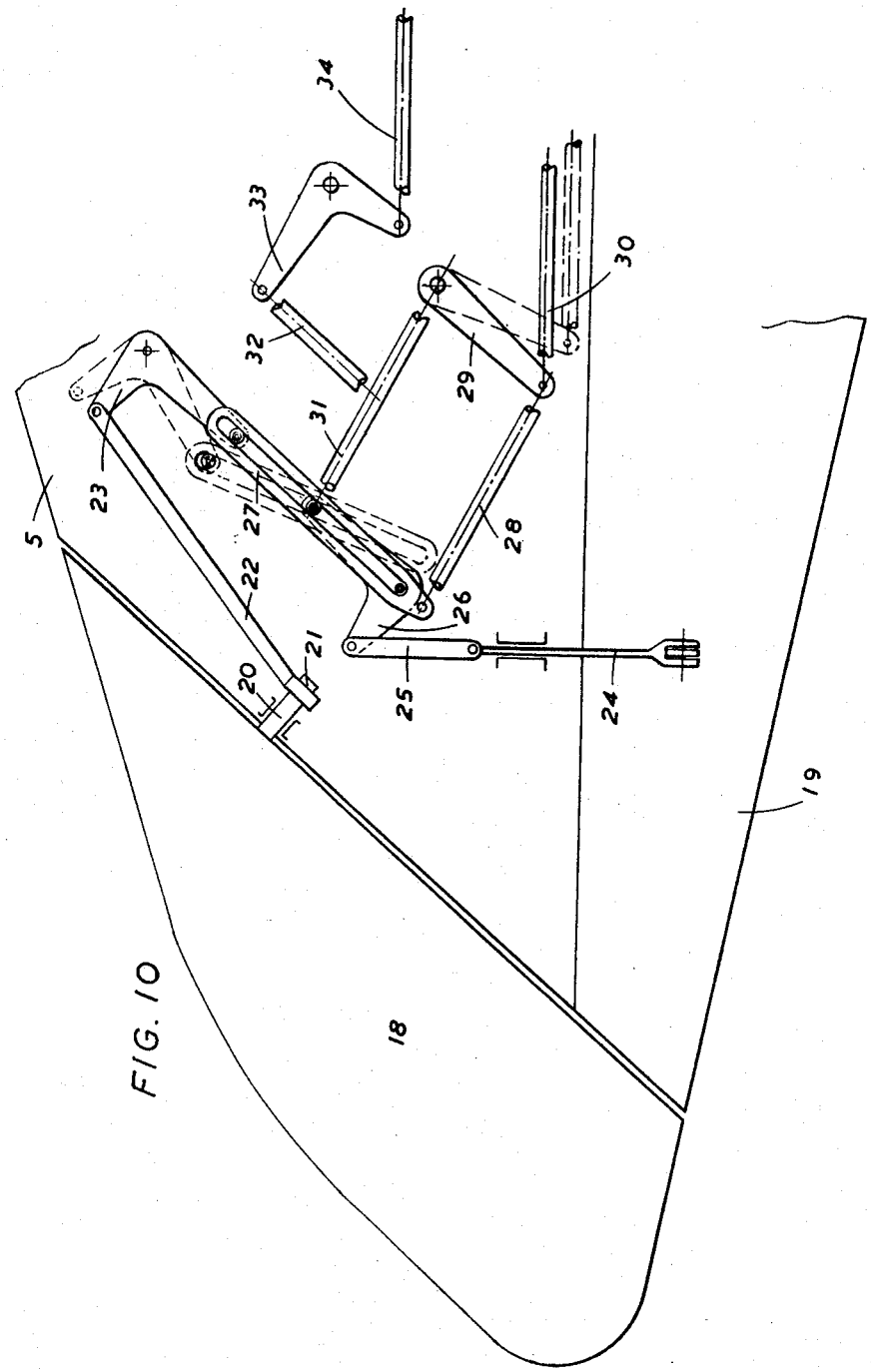

Each main wing 5 terminates in a movable wing tip 18 and also has a trailing edge aileron 19 (see Figures 3 and 4). The shaft 20 (see also Figures 8, 9 and 10) of the movable wing tip 18 has fast thereon a lever 21 which is connected by a link 22 to a bell crank lever 23. Similarly the operating member 24 of the trailing edge aileron 19 is connected as through a link 25 to a bell crank lever 26. The free limbs of the bell crank levers 23, 26 engage in the slot of an elongated member 27 which is at one end connected to a part 28 which is connected to a lever 29 to which is also connected an axially movable operating rod 30 operable under the pilot's control. The elongated slotted member 27 is at its mid-point also pivotally connected to a part 31 which conveniently pivots on the axis of the lever 29 and this part 31 is intermediate its length connected by a link 32 to one limb of a bell crank lever 33, the other limb of which is connected by a rod 34 to a fixed part 35 of the aircraft fuselage 1 at a point eccentric to the hinge 4 of the wing 5.

Thus with the mechanism in the position illustrated in Figures 4, 8 and 9, the fulcrum point of the elongated slotted member 27 is positioned over the end of the free limb of the bell crank lever 23 so that axial movement of the control rod 30 is rocking the elongated slotted member 27 rocks the bell crank lever 26 to effect displacement of the trailing edge aileron 19.

As the wing 5 moves back into its swept-back position of the eccentric positioning of the point 35 of connection of the rod 32 to the fuselage with respect to the hinge axis 4 of the wing is such that there is a virtual movement of the rod 34 with respect to the wing which progressively rocks the bell crank lever 33 to move the part 31 and hence the elongated slotted member 27 until, in the swept-back position of the wing (as in Figures 3 and 10), the fulcrum of the elongated slotted member 27 coincides with the end of the free limb of the bell crank lever 26 when the movement of the control rod 30 through to the elongated slotted member 27 causes that member to rock the bell crank lever 23 so moving the movable wing tip 18.

If at the time when the wing is moved the operable control surface is displaced for the purpose of lateral control, that displacement is is progressively proportionally transferred to the other control surface with the former appropriately restored to its zero position in which it is finally held during effective operation of the other surface.

Flight control may furthermore be assisted by providing at the rear ends of the skirts 3, electroscopic dive brakes, i. e., oppositely swinging hinged members 39 on the upper and lower surfaces respectively of such skirt 3 which may be swung out to project into the air stream when required.

Each wing 5 is moved between its spread position as in Figure 4 to its swept-back position as in Figure 3 by means of a hydraulic jack 36, the extension of the ram 36¹ of which effects the hinging movement of the wing 5 about its hinge (see also Figure 6). The supply of operating fluid to the jacks 36 for moving the respective wings 5 is regulated to ensure the synchronous or substantially equal rate of operation so that the two wings will move together. This may be accomplished, for example, by feeding the operating fluid from a controlling valve (not shown) through a conduit 50 to a regulating valve situated on the datum line of the fuselage, the body 51 of which valve is movable and contains pistons 52, 53 on a common piston rod 54, arranged to vary the openings to conduits 55, 56 connected to the respective jacks 36. The valve body 51 is connected by a link 57 to a bell crank lever 58 which is in turn connected by a link 59 to a bell crank lever 60 the other limb of which is connected by a link 61 to the wing 5. The piston rod 54 is connected by a link 62 to a bell crank lever 63 which is similarly connected by links and bell crank lever to the other wing. So long as the wings 5 move together at substantially the same rate their movements taken through the links and levers move both the valve body 51 and piston rod 54. If, however, the rate of movement becomes uneven some relative movement occurs between the valve body 51 and the piston rod 54 so that the pistons 52, 53 alter the size of the openings to the conduits 55, 56 with the result that the supply of fluid to the more rapidly moving jack is throttled whilst more fluid is supplied to the other jack to increase its rate of operation, until the lagging wing catches up whereupon the valve body 51 and piston rod 54 are restored to normal relative position.

The wing 5 is locked in its spread position (see Figures 4 and 6) by a portion 65 thereof abutting a part 66 of the fuselage such that a projection 67 on the abutment 66 may enter a bore 68 in the wing portion 65. A jack 69 has a piston rod 70 capable on entering another bore in the wing portion 65 effectively to lock the wing in spread position as shown in broken lines in Figure 6. A similar hydraulic jack 71 (see Figures 3 and 4) has its piston 72 capable of engaging in a bore 73 in the trailing edge of the main wing 5 when the same is in swept-back position in order effectively to lock the main wing in that position. Other locking means may additionally or alternatively be provided.

When the wings are swept backwards or forwards there are appreciable changes in the longitudinal position of the centre of pressure. These large changes are appreciably reduced by the associated, and opposite, movements of the auxiliary wings 86 in the horizontal plane. In spite of this, the aircraft might be dangerously out of longitudinal trim if it were not for the fact that comparable movement of the centre of gravity of the whole aircraft is arranged for. The weight of the wing structure itself gives a movement of the centre of gravity which is in the right sense but which is not necessarily sufficient to offset the displacement of the centre of pressure. This movement of the centre of gravity can be accentuated by mounting fuel tanks in the wing leading edges and arranging that the fuel from these tanks will not be used until the wings are swept forward for the last time in any one flight for the descent and landing, for example in the manner described in the specification of the pending United States patent application Ser. No. 167,718. The weight of the tanks and fuel is therefore effective in producing movement of the centre of gravity at all times when the wings are swept forwards or back and in conjunction with the movement of the auxiliary wings 86 ensure a minimum of change in the longitudinal trim of the aircraft. If the fuel is used from these tanks during the descent, no adverse change in position of the centre of gravity will result, since in the wing spread configuration as in Figure 4 which is used for the final stages of each flight, the aircraft lay-out is such that the centre of gravity and centre of aerodynamic pressure are correctly associated without being dependent on the fuel content in the wing tanks.

The aircraft may furthermore be provided with a detachable cockpit which is separable from the fuselage in an emergency and such detachable cockpit is preferably stabilised in pitch and yaw as described in the specification of the pending United States patent application Serial No. 167,718.

We claim:

1. A high speed aircraft of the class described, comprising: a fuselage; shrouds extending longitudinally of said fuselage outboard thereof; a pair of main wings pivoted to said fuselage outboard thereof and within said shrouds, said main wings being movable between a high speed load supporting position in which they form an acute angle with respect to the longitudinal axis of said fuselage and a low speed load supporting position in which said main wings extend substantially normal to said longitudinal axis, said shrouds acting cooperatively with respect to the main wing surfaces in both positions of said main wings, each main wing having a recess in the inboard trailing portion thereof; an auxiliary wing operatively associated with each main wing and movable with respect to each main wing and said fuselage and adapted to enter and emerge from said recess; and actuating means interconnecting said auxiliary wings, said main wings and said fuselage, said actuating means causing each auxiliary wing to enter at least partially within one of said recesses when said main wings are moved to said high speed position and to emerge at least partially therefrom when said main wings are moved to said low speed position, said auxiliary wings being shaped to form an extension of each main wing for increasing the chord of the inboard portion thereof when said main wings are moved to said slow speed position.

2. An aircraft according to claim 1, wherein said auxiliary wings are each pivoted to one of said main wings for rotation about a vertical axis, and wherein said actuating means comprises a pair of link members pivoted to opposite sides of said fuselage and to said auxiliary wings.

3. An aircraft according to claim 2, in which each main wing is provided with an arcuate track concentric with said vertical axis of rotation, and wherein each auxiliary wing is provided with means movable along said track.

4. An aircraft according to claim 1, in which each of said auxiliary wings is pivoted to one of said main wings for rotation about a horizontal axis, whereby said auxiliary wings may be lowered to act as flaps when said main wings are in said slow speed position.

GEOFFREY TERENCE ROLAND HILL.
THOMAS GEORGE GUPPY.

References Cited in the file of this patent

UNITED STATES PATENTS

| Number | Name | Date |
|---|---|---|
| 1,215,295 | MacKay | Feb. 6, 1917 |
| 2,074,897 | Everts | Mar. 23, 1937 |
| 2,173,538 | McKellar | Sept. 19, 1939 |
| 2,376,636 | Thompson | May 22, 1945 |
| 2,419,161 | Pitt | Apr. 15, 1947 |
| 2,511,265 | Hoopingarner | June 13, 1950 |
| 2,555,862 | Romani | June 5, 1951 |
| 2,596,436 | Robert | May 13, 1952 |

FOREIGN PATENTS

| Number | Country | Date |
|---|---|---|
| 454,556 | Great Britain | Sept. 28, 1936 |
| 856,763 | France | Apr. 1, 1940 |